(12) United States Patent
Bernhardt

(10) Patent No.: US 8,991,793 B1
(45) Date of Patent: Mar. 31, 2015

(54) UAV CAPTURE OF MICRO CARGO ALOFT

(75) Inventor: Roger D. Bernhardt, OFallon, MO (US)

(73) Assignee: The Boeing Company, Chicago, IL (US)

( * ) Notice: Subject to any disclaimer, the term of this patent is extended or adjusted under 35 U.S.C. 154(b) by 164 days.

(21) Appl. No.: 13/482,859

(22) Filed: May 29, 2012

(51) Int. Cl.
  *B64D 1/22* (2006.01)
  *B64D 37/32* (2006.01)

(52) U.S. Cl.
  CPC .................................. *B64D 37/32* (2013.01)
  USPC ............................................. 258/1.2; 258/1.6

(58) Field of Classification Search
  CPC ................................ B64D 1/22; B64C 39/028
  USPC .................. 258/1.2, 1.6; 244/110 G
  See application file for complete search history.

(56) References Cited

U.S. PATENT DOCUMENTS

| | | | |
|---|---|---|---|
| 2,306,690 A * | 12/1942 | Du Pont et al. | 258/1.8 |
| 2,560,563 A | 7/1951 | Fink et al. | |
| 3,167,303 A | 1/1965 | Cotton | |
| 3,176,327 A | 4/1965 | Oberth | |
| 3,336,005 A * | 8/1967 | Dickerman | 258/1.2 |
| 7,090,166 B2 | 8/2006 | Dennis et al. | |
| 7,104,495 B2 | 9/2006 | McGeer | |
| 7,114,680 B2 | 10/2006 | Dennis | |
| 7,143,976 B2 * | 12/2006 | Snediker et al. | 244/11 OG |
| 2005/0151009 A1 | 7/2005 | Roeseler et al. | |
| 2005/0178894 A1 | 8/2005 | McGeer et al. | |

* cited by examiner

*Primary Examiner* — Mark Le
(74) *Attorney, Agent, or Firm* — Felix L. Fischer

(57) ABSTRACT

A system of transporting micro-cargo incorporates an unmanned aerial vehicle (UAV) having a tether capture device. A tether is connected to and suspends a micro cargo container with a suspension system to vertically extend the tether. The system having a first pickup state and a second flight state with a transition between the first and second states. The first state provides the micro-container unsuspended via the tether from the suspension system. The transition state provides engagement of the tether by the UAV, the tether positioning the micro-cargo container with respect to the capture device which secures the tether. The second state is then entered with the micro-cargo towed by the UAV in cruising flight to its destination.

8 Claims, 12 Drawing Sheets

UAV CAPTURE OF MICRO CARGO ALOFT

BACKGROUND INFORMATION

1. Field

Embodiments of the disclosure relate generally to the field of extraction of micro cargo by air pickup and more particularly providing a system for capture of a of a suspended micro cargo tethered by an Unmanned Aerial Vehicle (UAV) with a tether capture device.

2. Background

Extraction of cargo from remote sites typically requires either ground or air transport from a first location to a desired transport point. For extraction by air the aircraft must land, take the cargo onboard, take off and fly to the destination. For small parcels or "micro cargo", the time, fuel and potential hazards of landing an aircraft to retrieve the micro cargo or the lack of suitable landing sites may require transport of the cargo by land. In certain instances such as biological or natural disasters, landing an aircraft for retrieval of a micro cargo such as biological samples in medical emergencies or epidemics or radiological samples in a nuclear disaster may not be advisable. Similarly, clandestine removal of micro cargo such as computer storage media or physical materials may not allow the use of normal aircraft.

It is therefore desirable to provide a method and system for aerial retrieval and transport of micro cargo in which landing is not required.

SUMMARY

Embodiments disclosed herein provide a system of transporting micro-cargo incorporating an unmanned aerial vehicle (UAV) having a tether capture device. A tether is connected to and suspends a micro cargo container with a suspension system to vertically extend the tether. The system having a first pickup state and a second flight state with a transition between the first and second states. The first state provides the micro-container suspended via the tether from the suspension system. The transition state provides engagement of the tether by the UAV, the tether positioning the micro-cargo container with respect to the capture device which secures the tether. The second state is then entered with the micro-cargo towed or retracted into the body for transport by the UAV in cruising flight to its destination.

The embodiments allow method for transport of micro cargo wherein a micro cargo is loaded into a micro cargo container and suspended. The micro cargo container is constrained with a securing line to position the micro cargo container with respect to a surface placing the system in a first state. A UAV having a tether capture device is directed to the suspended tether for engagement. In a transition state, the tether is engaged with a leading edge of one wing of the UAV and the tether slides to the capture device. The tether capture device engages the tether. The micro cargo container is then towed with the UAV in a second system state.

The features, functions, and advantages that have been discussed can be achieved independently in various embodiments of the present disclosure or may be combined in yet other embodiments further details of which can be seen with reference to the following description and drawings.

DETAILED DESCRIPTION

Embodiments disclosed herein provide a system for retrieving a micro cargo suspended with a tether using a UAV. The UAV engages the tether without landing and tows the micro cargo container to a desired location.

Figure 1:
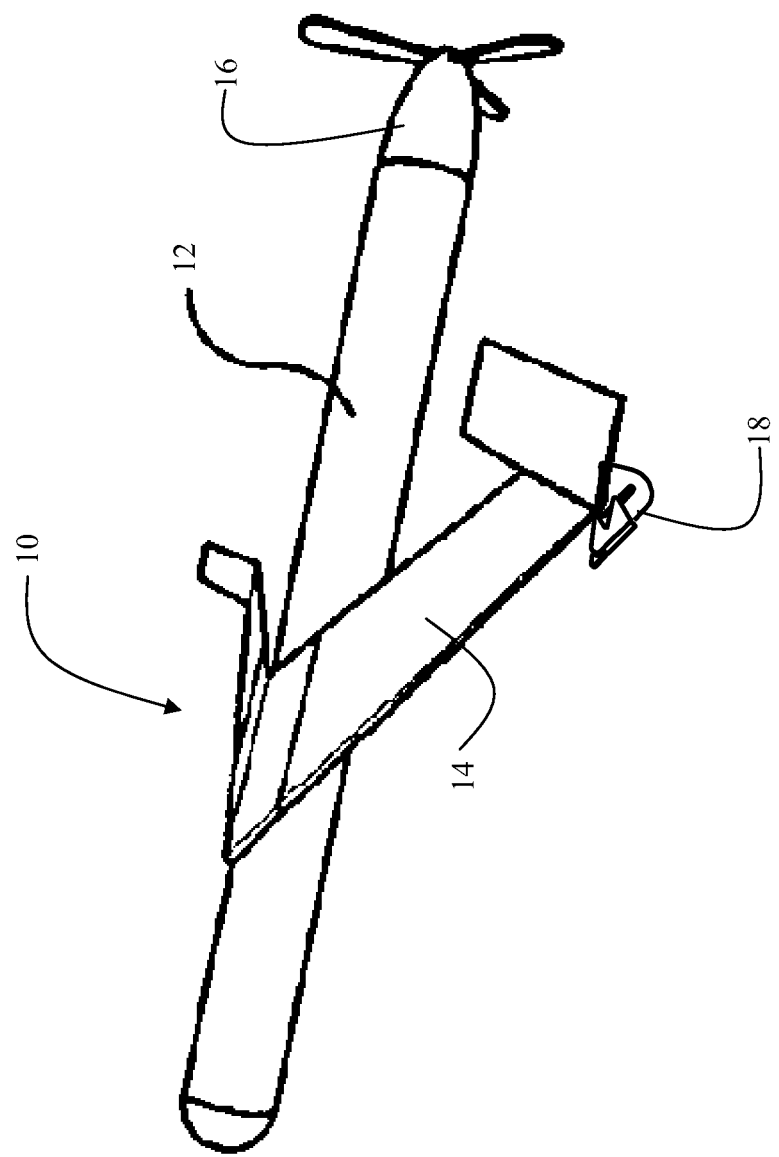
FIG. 1 is pictorial view of an example UAV for use with the present system.

As shown in FIG. 1, a UAV 10 for use with the system embodiments may be an air vehicle similar to the Boeing ScanEagle. The UAV 10 incorporates a fuselage 12, wings 14 and a propulsion system such as a reciprocating engine and propeller 16. At least one tether capture device 18, which will be described in greater detail subsequently, is provided for engagement of a tether supporting the micro cargo.

Figure 2:
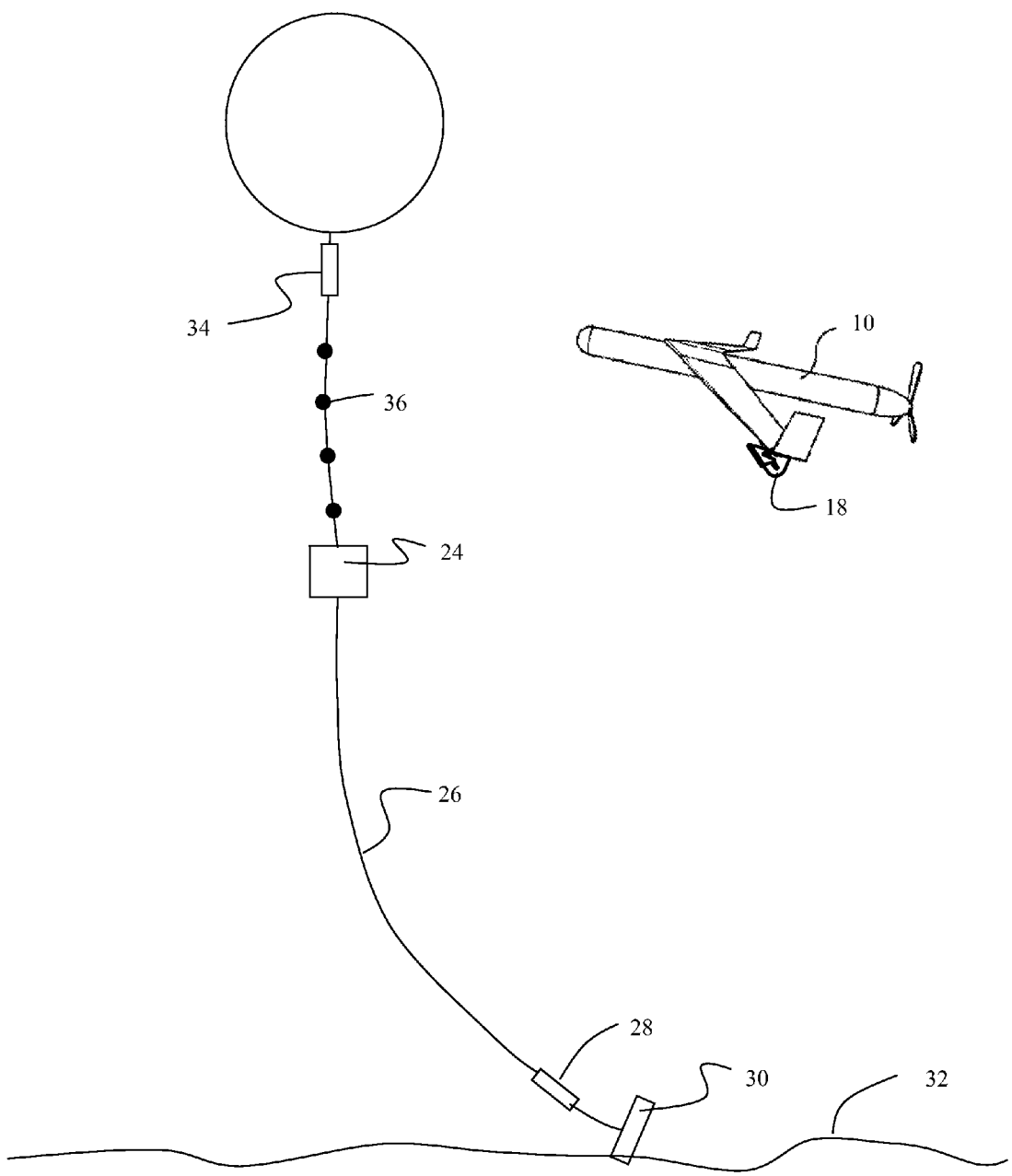
FIG. 2 is a pictorial schematic of an embodiment of a example micro cargo lofting system.

As shown in FIG. 2, one embodiment for suspending the micro cargo is to employ a balloon 20 from which a tether 22 attached to the balloon at a first end extends to carry a micro cargo container 24 attached at a second end. In certain instances, the balloon 20, tether 22 and micro cargo container could be free floating, however, advanced guidance and intercept systems would be required. In an example embodiment, a securing line 26 extends downward from the micro cargo container 24 to a release element such as lower separation link 28 which is attached to a stake 30 or similar securing device on the ground or launch surface 32. In the embodiment shown, the first end of the tether 22 is attached to the balloon 20 with a suspension separation link 34 as a release element. The tether 22 may include capture nodes 36 spaced along the length of the tether to assist in securing the tether to the tether capture device 18 as will be described in greater detail subsequently. Suspension if the micro cargo container in this pre-capture position provides a first state for the system.

As shown in FIG. 2, the UAV 10 approaches the suspended tether 22 for engagement by the tether capture device 18 as will be described in greater detail subsequently. Upon engagement, for the embodiment shown, drag forces created by the balloon 20 and the ground stake 30 cause the suspension separation link 34 and the lower separation link 28 to rupture or separate allowing the tether 22, micro cargo container 24 and securing line 26 to trail behind the UAV in tow. The engagement of the tether with associated secondary events such as separation of the balloon and ground stake constitutes a transition state for the system. Once capture has been accomplished, the UAV with the micro cargo container in tow constitutes a second state for the system.

Figure 3A:
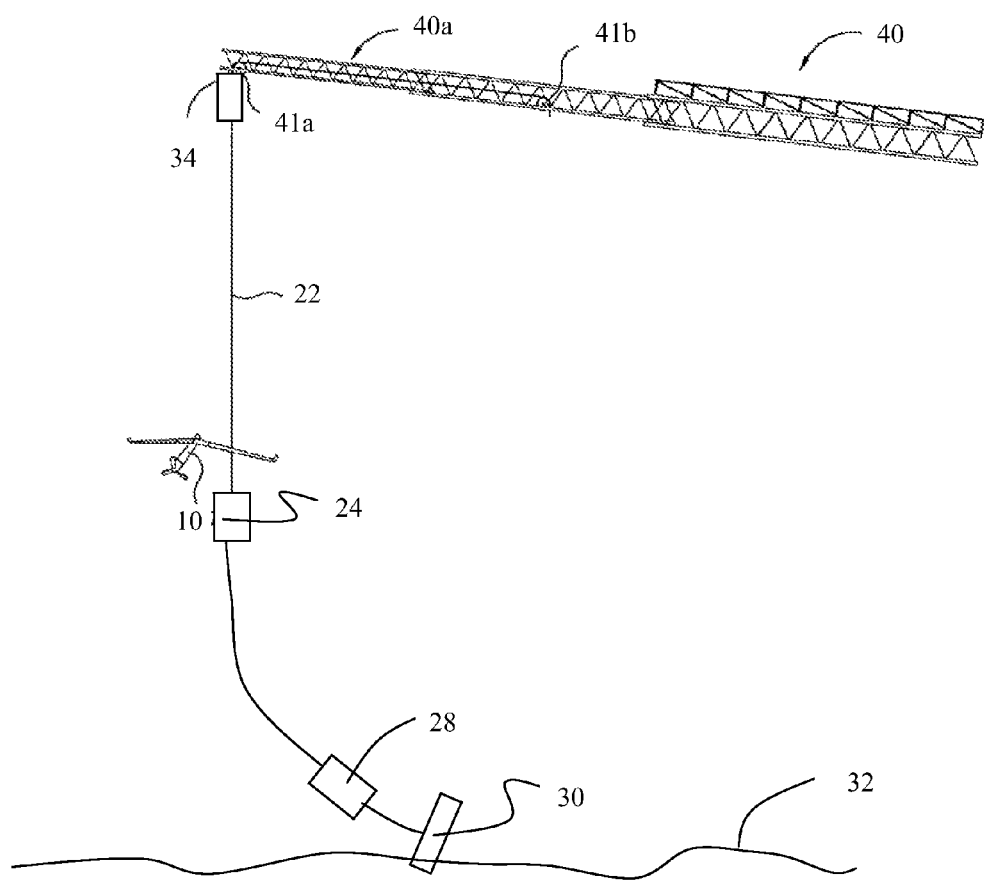
FIG. 3A is a pictorial schematic of an embodiment of a micro cargo pickup suspension system.

FIG. 3A demonstrates an alternative embodiment for suspending the micro cargo using a suspension arm 40 for the first state of the system. The suspension arm 40 may be supported from a building, a crane, a ship or other land or sea vehicle or as a portion of a UAV launching system as disclosed in U.S. Pat. No. 7,090,166 entitled METHODS AND APPARATUSES FOR LAUNCHING UNMANNED AIRCRAFT, INCLUDING METHODS AND APPARATUSES FOR TRANSMITTING FORCES TO THE AIRCRAFT DURING LAUNCH issued on Aug. 15, 2006 and having a common assignee with the present invention, the disclosure of which is incorporated herein by reference. The suspension arm 40 may have extendable elements 40a to increase height and/or horizontal distance from the mounting point. Additionally, the suspension arm may include pulleys 41a and 4b for positioning of the tether 22. As shown for the balloon suspension system of FIG. 2, the micro cargo container 24 is suspended with the tether 22. A suspension separation link 34 attaches the tether 22 to the suspension arm 40 and a securing line 26 extends downward from the micro cargo container 24 to a lower separation link 28 which is attached to a stake 30 or similar securing device on the ground or launch surface 32.

Figure 3B:
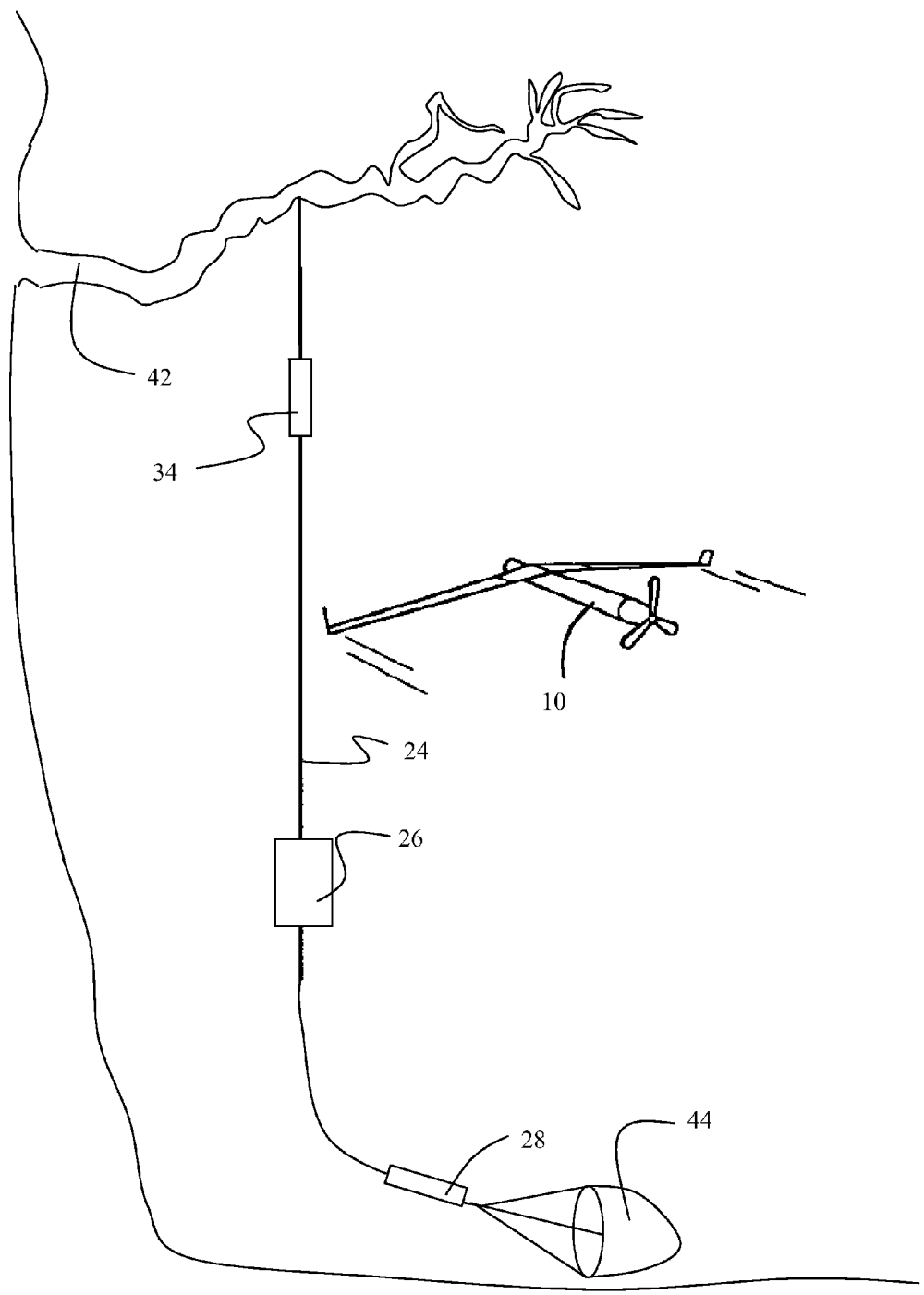
FIG. 3B is a pictorial schematic of a second embodiment of a micro cargo pickup suspension system.

A second embodiment for fixed suspension of the micro cargo container is shown in FIG. 3B. In stead of a structural suspension arm, a natural or environmental element such as a tree branch 42 is employed to suspend the tether 22 in the first state of the system. The micro cargo container 24 is suspended with the tether 22, a suspension separation link 34 attaches the tether 22 to the tree branch 42 and a securing line 26 extends downward from the micro cargo container 24 to a lower separation link 28. An alternative for production of drag to assist in securing the tether 22 in the tether capture device 18, a drag producing device such as a drag chute 44, is shown in FIG. 3B. The drag chute 44 is attached to the lower separation link 28. When initially contacted by the UAV 10 and tether capture device 18 during the transition state, the combination of the tree branch and aerodynamic force on the drag chute 44 provides the necessary force to secure the tether 22 in the tether capture device 18. As previously described with respect to the prior embodiments, the continued drag force then results in separation of the suspension separation link 34 and lower separation link 28 to disencumber the towed tether 22 and micro cargo container 24 for better performance of the UAV 10. Use of a drag chute may also be employed if the terminal end of the securing line is place in the water with the tether suspended from a balloon or suspension arm on a ship.

Figure 3C:
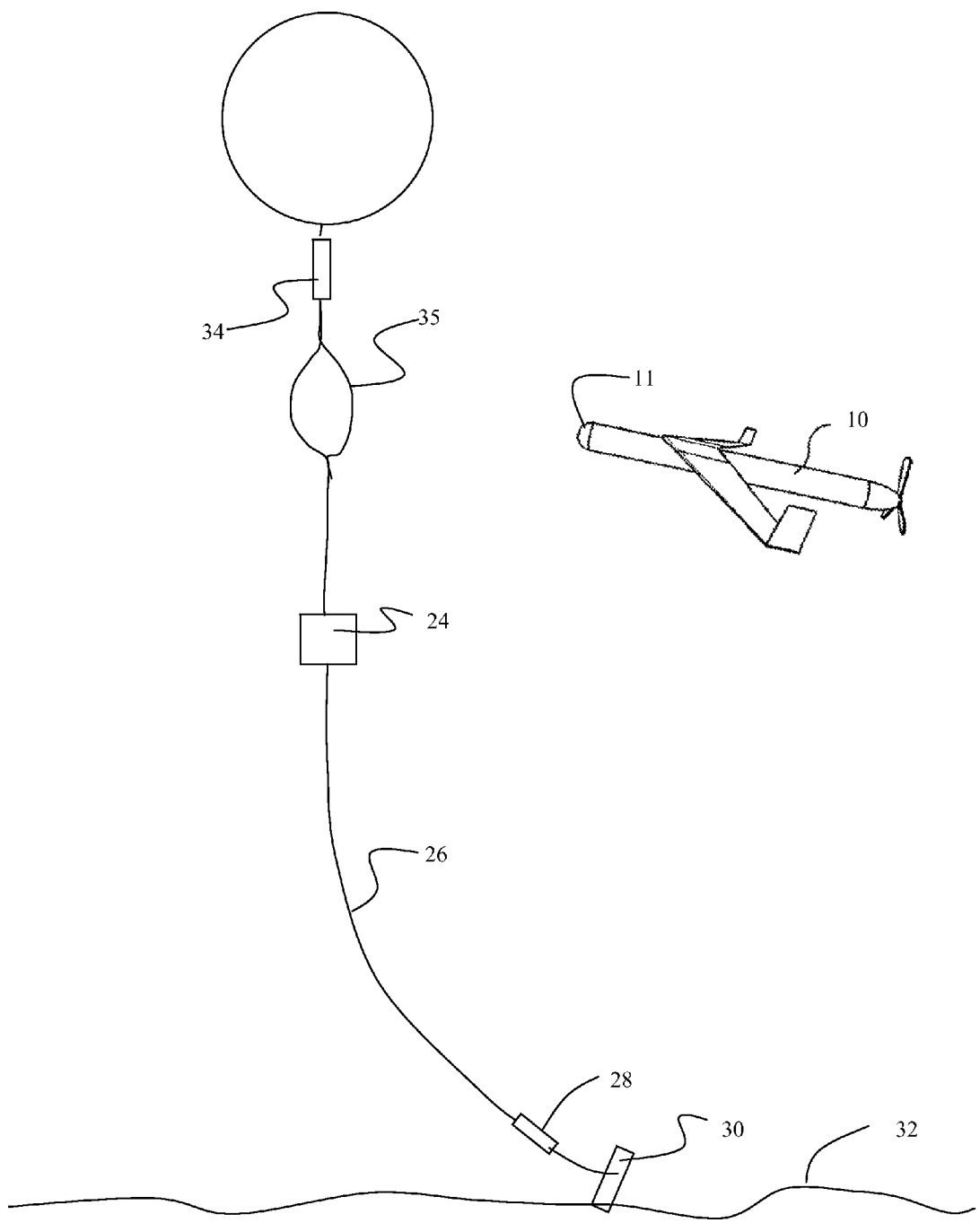
FIG. 3C is a pictorial schematic of an alternative embodiment of the tether for capture by flying the nose of the UAV into an open loop in the tether for a symmetric flight configuration.

As shown in FIG. 3C, an alternative arrangement of the tether 22 may be provided such that capture is achieved by flying the nose 11 of the UAV 10 into an open loop 35 in the tether for a symmetric flight configuration upon capture.

Figure 4A:
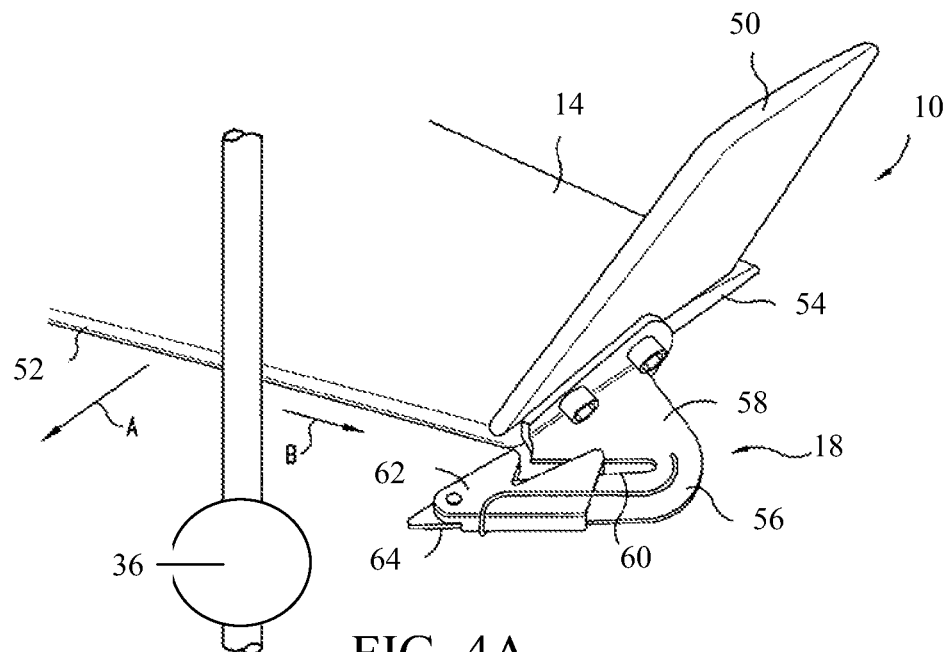
FIG. 4A is a detailed isometric of a wingtip mounted tether capture device prior to engagement of a tether.

FIG. 4A is a partially schematic, isometric illustration of an outboard portion of the wing 14 and the winglet 50 of the UAV 10 shown in FIG. 1. In this embodiment, the wing 14 includes a leading edge 52 (which can be swept), an outboard edge 54, and the tether capture device 18 positioned at the outboard edge 54. In other embodiments, each wing 14 can include a plurality of tether capture devices 18 located along the span of the wing 14 as will be discussed with respect to FIGS. 5A and 5B. In any of these embodiments, the tether capture device 18 can include a cleat 56 fixedly attached to the wing 14 that engages the tether 22 to securely attach tether 22 to the aircraft 10. The cleat 56 can include a cleat body 58, a cleat slot 60 positioned in the cleat body 58, and a gate or retainer 62 attached to the cleat body 58. As the UAV 10 flies toward the tether 22 (as indicated by arrow A), the tether 22 strikes the wing leading edge 52. Drag created by the suspended condition of the tether 22 from either the balloon 20, suspension arm 40 or tree branch 42 causes the UAV to yaw toward the tether 22, which then slides outboard along the leading edge 52 toward the tether capture device 18 (as indicated by arrow B). The tether 22 then passes into the cleat slot 60, which is sized to pinch the diameter of the tether 22, and is retained in the cleat slot 60 by the retainer 62, as described in greater detail below with reference to FIG. 4B. In other embodiments, the retainer 62 can be eliminated and the tether 22 can still be securely pinched in the cleat slot 60. As previously described, tension on the two ends of the tether from the suspension point link and the ground retention link urge the tether into the pinching cleat. If uneven tension is present in the two ends of the tether causing the tether to slide along its axis in the cleat slot, engagement of a capture node 36 as previously described will position the tether for engagement in the cleat slot.

If the UAV 10 is not properly aligned with the tether 22 during its approach, the tether 22 may strike the tether capture device 18 instead of the leading edge 52. In one embodiment, the cleat body 54 includes a cleat leading edge 64 which is swept aft so as to deflect the tether 22 away from the UAV 10. This can prevent fouling of the line 22 and can reduce the yawing moment imparted to the UAV 10, allowing the UAV 10 to recover from the missed capture and to return for another capture attempt.

Figure 4B:
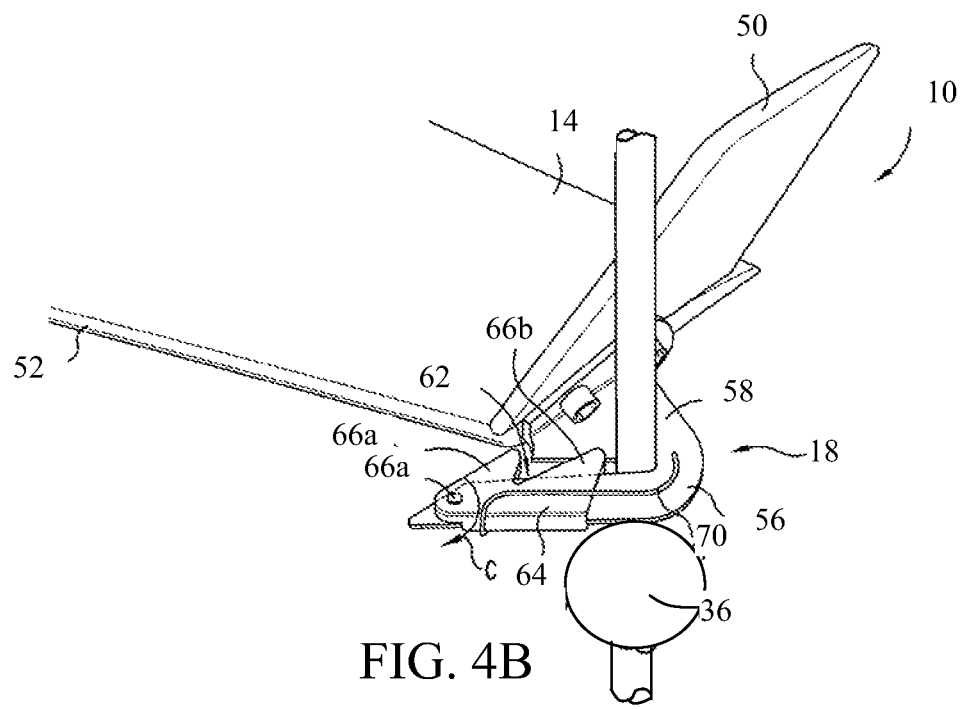
FIG. 4B is a detailed isometric of the wingtip mounted tether capture device after engagement of the tether.

FIG. 4B is an enlarged, isometric illustration of a portion of the wing 14 and the tether capture device 18 described above with reference to FIG. 4A. As described above with reference to FIG. 4A, the tether 22 travels outboard along the wing leading edge 52 to position the tether 22 at the cleat slot 60 of the tether capture device 18. In one aspect of this embodiment, the retainer 62 of the cleat 60 includes two or more closure arms (two are shown in FIG. 9B as a first closure arm 66a and a second closure arm 66b) that extend over the cleat slot 60. The retainer 62 is pivotally mounted to the cleat body 58 at a pivot joint 68, and is forced toward a closed position (shown in FIG. 4B) by a spring 70. As the tether 22 strikes the first closure arm 66a from outside the cleat slot 60, the force on the first closure arm 66a forces the retainer 62 to rotate about the pivot joint 68 (as indicated by arrow C) to an open position, allowing the tether 22 to move into the cleat slot 60. The tether 22 continues through the cleat slot 60, allowing the retainer 62 to begin closing as it passes the first closure arm 66a. The tether 22 then strikes the second closure arm 66b to force the retainer 62 back open again, and then travels further in the slot 60. In one aspect of this embodiment, the slot 60 (which can be tapered) has a width that is less than a diameter of the tether 22. Accordingly, the tether 22 can be pinched in the slot 60 as the tether 22 travels outboard and aft, securing the UAV 10 to the tether 22. The momentum of the UAV 10 relative to the tether 22 provides the impetus to securely engage the tether 22 with the tether capture device 18.

As described above, the retainer 62 can include a first closure arm 66a and a second closure arm 66b. One advantage of a retainer 62 having a first closure arm 66a and a second closure arm 66b is that, if the relative velocity between the tether 22 and the UAV 10 is insufficient to cause the tether 22 to travel to the end of the cleat slot 60, the retainer 62 can close around the tether 22, with the tether 22 positioned between the first closure arm 66a, and the second closure arm 66b. Accordingly, this arrangement can arrest and secure the line 22 even though the tether 22 has a relatively low outboard and aft velocity component relative to the UAV 10. Additionally, if the tether 22 is not pinched within the cleat slot 60, the capture nodes 36 above or below the closure arms 66a or 66b will secure the tether 22 within the retainer 62.

Figure 5A:
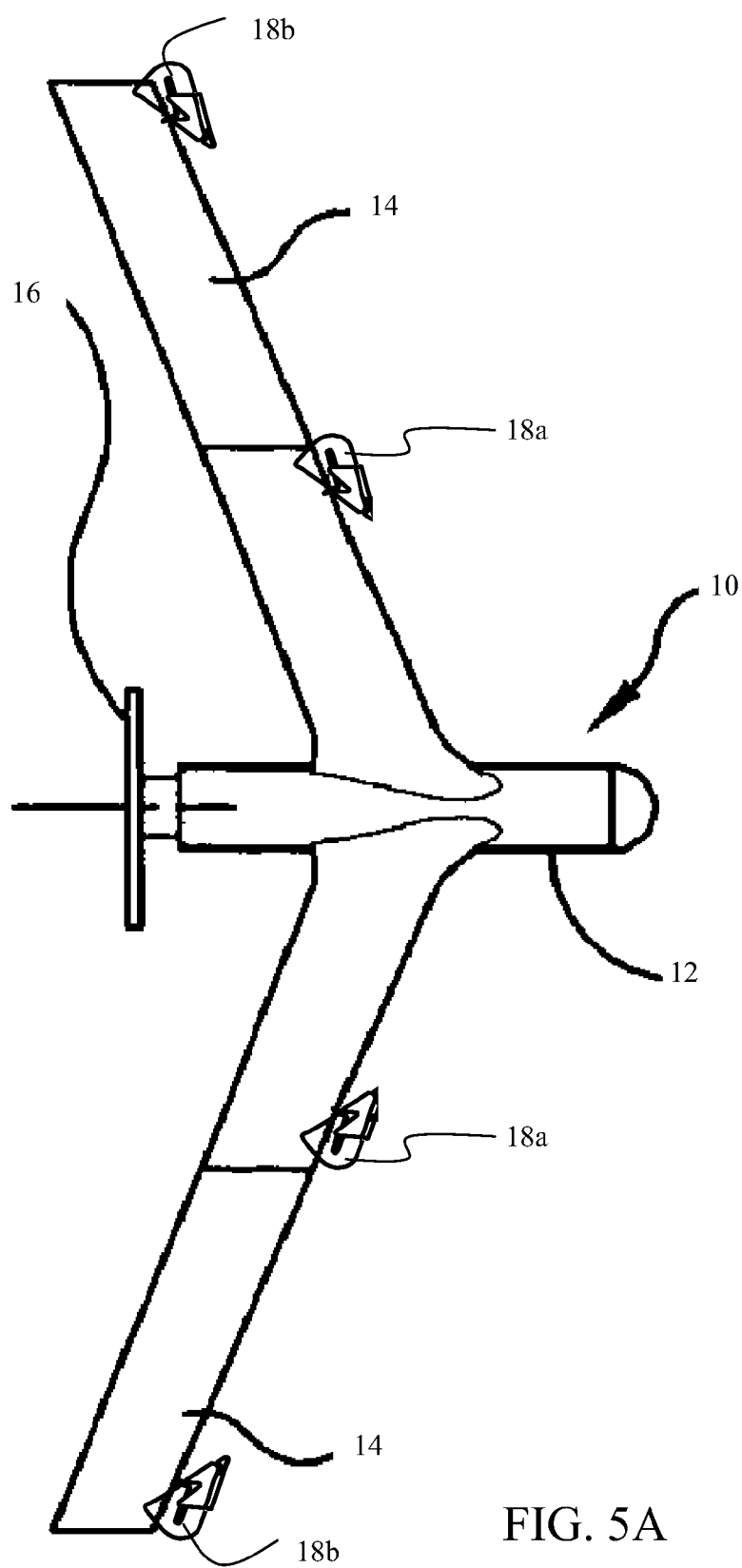
FIG. 5A is a top view of an alternative embodiment for placement of tether capture devices on the wing leading edge.

As previously described, multiple tether capture devices may be attached to the wings 14 of the UAV 10. As shown in FIG. 5A, inboard tether capture devices 18a are attached closer to the fuselage 12 with wing tip tether capture devices 18b located as previously described. Multiple capture devices allows compensation for minor course deviation by the UAV when intercepting the tether but allowing capture on either the inboard or wing tip capture device. While only two devices are shown in each wing, multiple devices may be attached with closer spacing. Placement of capture devices inboard closer to the fuselage 12 reduces the yaw moment created by the towed micro cargo container 24 and improves efficiency of the UAV 10 during the second state of the system for towing flight.

Figure 5B:
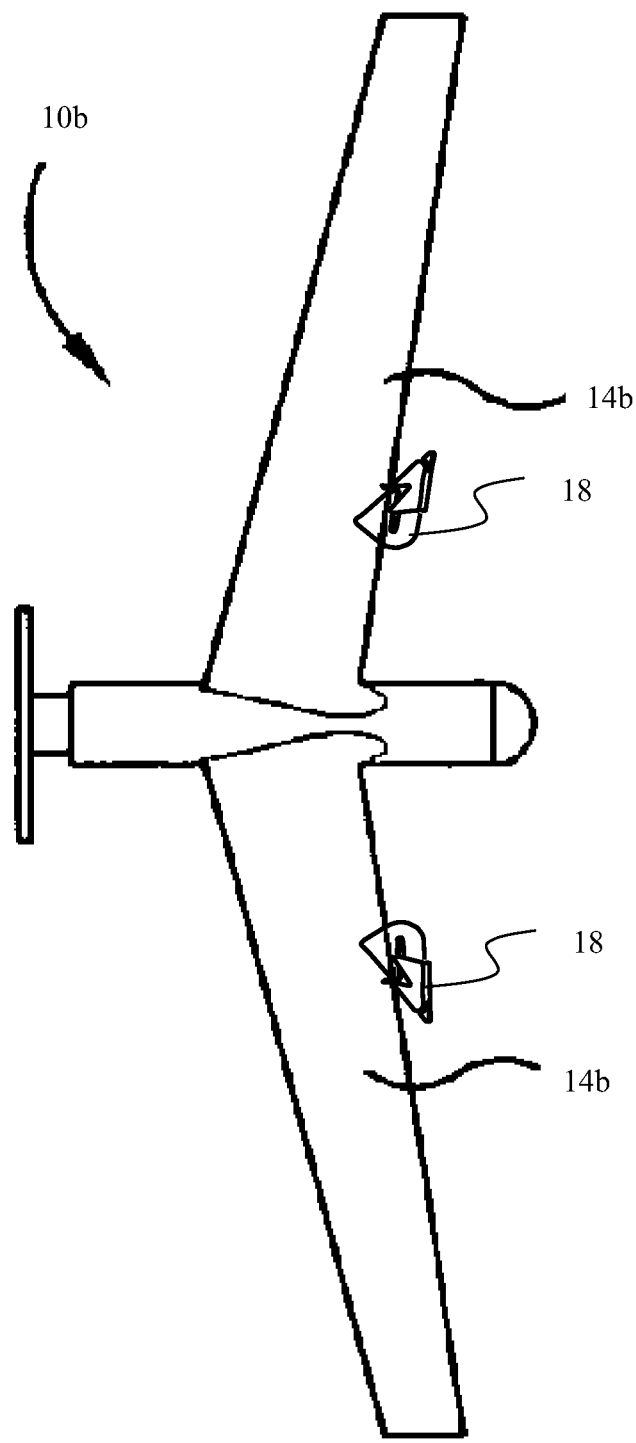
FIG. 5B is a top view of an alternative UAV embodiment with leading edge mounted tether capture devices.

FIG. 5B demonstrates an alternative configuration of the UAV 10 with forward swept wings 14. In this configuration, yaw created by interception of the tether 22 is reduced and placement of the tether capture devices 18 at a more inboard location on the wing is practical even with minor course deviations during intercept since the entire wing half span may be employed to "funnel" the tether 22 into the tether capture device 18 during the transition state.

Figure 6A:
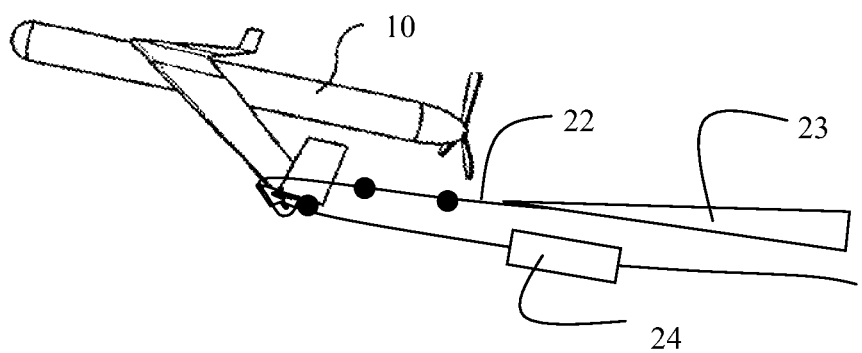
FIG. 6A is a pictorial view of the UAV with the micro cargo in tow.

The second state of the system with the micro cargo container 24 in tow by the UAV 10 is shown in FIG. 6A. The suspension separation link 34 and lower separation link 28 have separated leaving the tether 22 and lower securing line 26 trailing in the air stream. While shown in FIGS. 2, 3A and 3B as located at the extremes of the tether and securing line the separation links may be placed to reduce the trailing length of the tether and securing line in tow. Also as shown in FIG. 6A, the tether 22 may employ differing weight or configuration such as flag portion 23 to achieve differential drag on the towed elements to properly position the tether within the tether capture device 18. In example embodiments, the separation links may be reduced diameter portions of the tether and securing line forming frangible links which rupture under the drag forces induced by the UAV capture or they may be separable elements such as hook and loop fasteners or spring loaded devices. In alternative systems, active separation devices such as hot wire cutters or laser cutting systems may be employed to sever the tether and securing line.

Figure 6B:
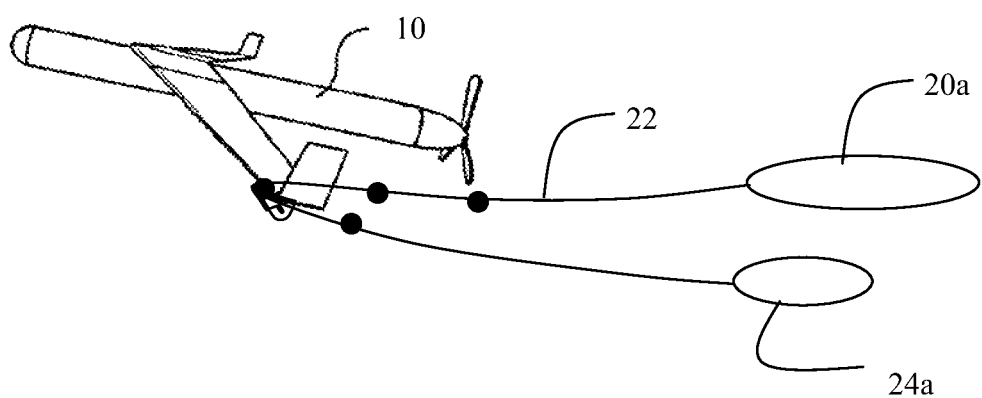
FIG. 6B is a pictorial view of the UAV with aerodynamic balloon and micro cargo container in tow.

Alternatively as shown in FIG. 6B, the balloon 20a may be a streamlined shape such that excessive drag is not created and separation of the tether from the balloon is not required for adequate towing performance by the UAV. The micro cargo container 22a may also be aerodynamically streamlined for better towing performance.

Figure 6C:
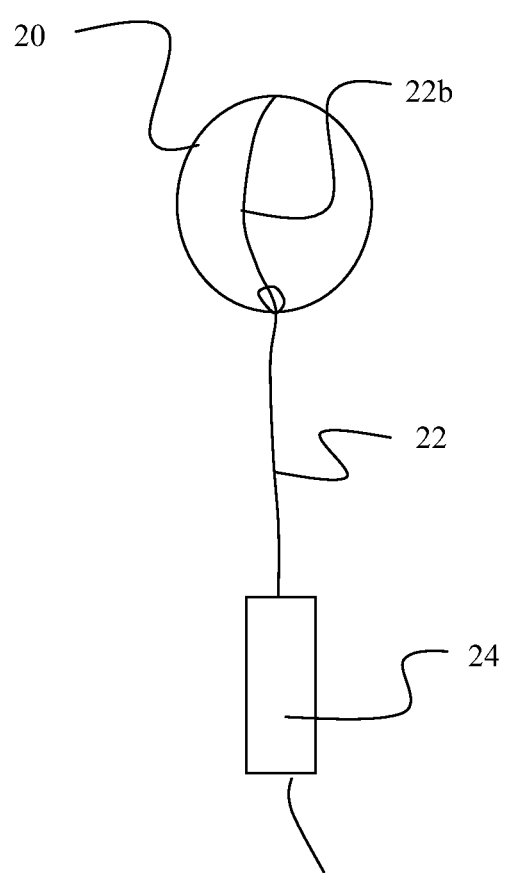
FIG. 6C is a schematic view of a tether guillotine for deflating the balloon.

Rather than separating from the balloon 20, the balloon may be punctured to deflate thereby reducing the drag during tow in the second state of the system. As shown in FIG. 6C, the tether may employ a guillotine section 22b having a sharp or barbed profile extending over the balloon 20 and pulling through a slip ring or similar arrangement such that drag created by the capture tether tightens the guillotine section to puncture the balloon. Alternatively as with the severing of the tether, active systems such as laser or heated wires may be employed to puncture the balloon.

Figure 6D:
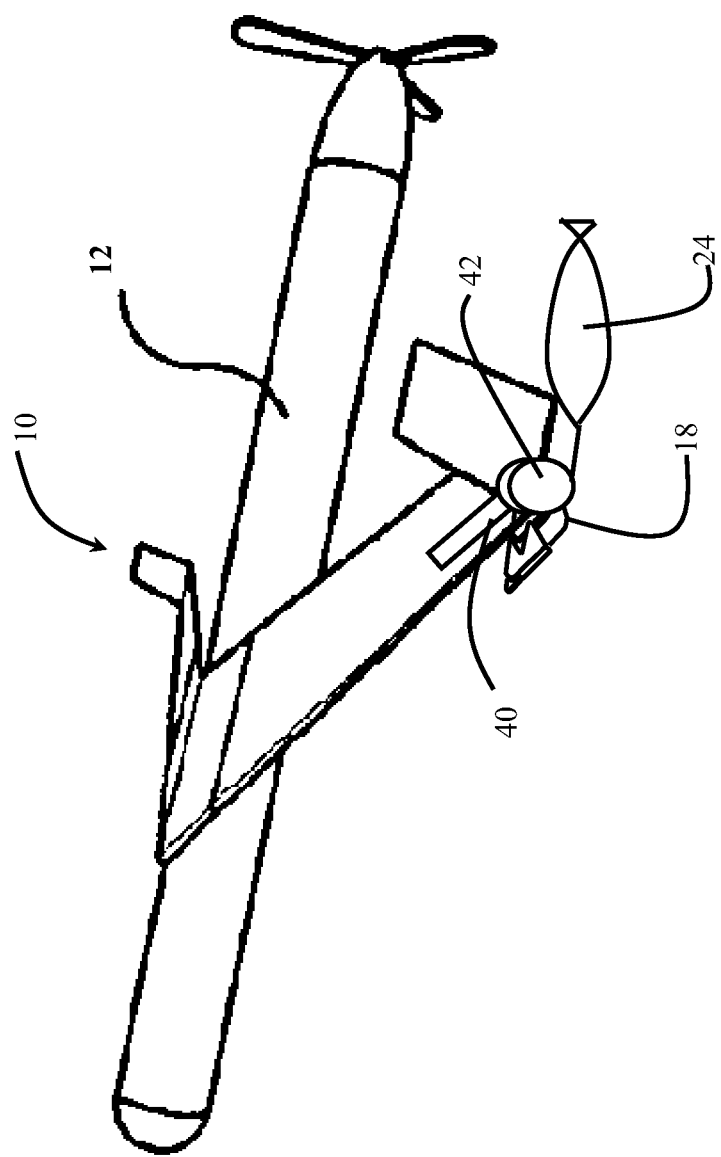
FIG. 6D is a pictorial view of the UAV with a reeled in micro cargo container; and, FIG. 7 is a flow chart depicting the operation of the embodiments of the system as disclosed.

Improvement in aerodynamic performance may also be achieved by reeling the tether into the UAV or into the micro cargo container after capture and separation. As shown in FIG. 6D, the capture device 18 may be attached to the UAV with a spring loaded reel 40 which, when activated, reels in the captured tether 22 onto a spool 42 drawing the micro cargo container 24 into close proximity to the UAV 10. For embodiments as disclosed with respect to FIG. 3C, the cargo container may be reeled into an enclosed bay within the UAV fuselage 12

Figure 7:
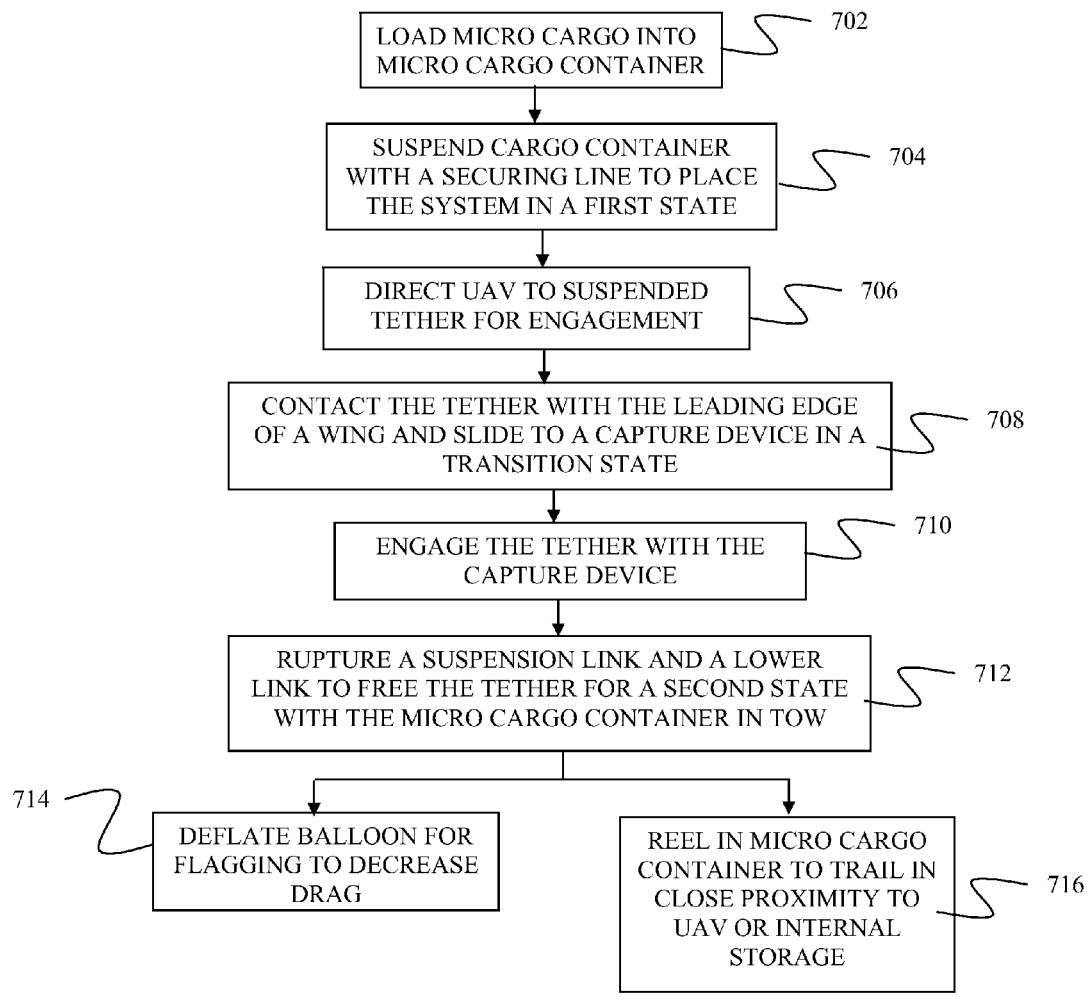

FIG. 7 shows the operation of the system as described for the embodiments herein. A micro cargo is loaded into a micro cargo container, step 702, and suspended by a tether, from a balloon, suspension arm or natural object, with a securing line to position the micro cargo container with respect to a surface placing the system in a first state, step 704. A UAV having a tether capture device is directed to the suspended tether for engagement, step 706. In a transition state, the tether contacts the leading edge of one wing of the UAV and slides to the tether capture device, step 708. The tether capture device engages the tether by pinching the tether in a slot, engaging the tether with closure arms and/or engaging a suspension node as the tether is drawn through the capture device, step 710. In releasing embodiments, a suspension link and a lower link are ruptured freeing the tether and securing line allowing the UAV to be placed in a second state for the system with the micro cargo container in tow, step 712. In alternative embodiments for a balloon suspension, the tether may remain attached to the balloon which is aerodynamically streamlined for tow or the balloon may be punctured or otherwise deflated for flagging during tow, step 714. The tether may alternatively be reeled in for trailing in close proximity to the UAV or for encapsulation within a bay in the UAV fuselage, step 716.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

What is claimed is:

1. A system of transporting micro-cargo comprising:
an unmanned aerial vehicle having a tether capture device;
a tether connected to and suspending a micro cargo container;
a balloon to vertically extend the tether; the system having a first pickup state and a second flight state with a transition between the first and second states, the first state wherein the micro cargo container being suspended via the tether from the suspension system, the transition state being the tether engaged by a wing of the UAV, the tether positioning the micro-cargo container with respect to the capture device which secures the tether wherein the tether incorporates a sharp edge for engagement of the balloon during the transition state to puncture the balloon, and the second state being the micro cargo container in cruising flight to its destination.

2. The system of claim 1 wherein the second end of the tether incorporates a release element.

3. The system of claim 2 wherein the release element is a frangible link.

4. The system of claim 1 wherein the suspension system further includes a securing line attaching the micro cargo container to a launch surface.

5. The system of claim 4 wherein the securing line is connected to a second release element.

6. The system of claim 4 wherein the launch surface is the ground and the securing line is attached to a ground stake.

7. The system of claim 1 wherein the tether incorporates a positioning mechanism for positioning of engagement by the capture device during the transition state.

8. The system of claim 7 wherein the positioning mechanism includes a flag portion on the tether for additional aerodynamic drag.

\* \* \* \* \*